US010831378B2

(12) United States Patent
Johnson et al.

(10) Patent No.: US 10,831,378 B2
(45) Date of Patent: Nov. 10, 2020

(54) OPTIMIZING DATA ACCESS IN A DSN MEMORY FOR WEAR LEVELING (71) Applicant: International Business Machines Corporation, Armonk, NY (US)

(72) Inventors: Trent W. Johnson, Chicago, IL (US); Praveen Viraraghavan, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/139,156

(22) Filed: Sep. 24, 2018

(65) Prior Publication Data
US 2020/0097186 A1    Mar. 26, 2020

(51) Int. Cl.
*G06F 3/06* (2006.01)
*G06F 11/10* (2006.01)

(52) U.S. Cl.
CPC ............ *G06F 3/0616* (2013.01); *G06F 3/067* (2013.01); *G06F 3/0619* (2013.01); *G06F 3/0653* (2013.01); *G06F 3/0659* (2013.01); *G06F 11/1076* (2013.01)

(58) Field of Classification Search
CPC .................................................. G06F 11/1076
See application file for complete search history.

(56) References Cited

U.S. PATENT DOCUMENTS 9,274,890 B2    3/2016  Gladwin et al.
9,690,513 B2    6/2017  Resch

| 2009/0138654 | A1* | 5/2009  | Sutardja | G06F 12/0246 711/103 |
| 2009/0193174 | A1* | 7/2009  | Reid     | G06F 12/0246 711/100 |
| 2009/0265503 | A1* | 10/2009 | Hung     | G06F 12/0246 711/100 |
| 2010/0262793 | A1* | 10/2010 | Hetzler  | G06F 12/0246 711/157 |
| 2011/0066808 | A1* | 3/2011  | Flynn    | G06F 12/0246 711/118 |
| 2015/0067421 | A1* | 3/2015  | Baptist  | H04L 67/1097 714/723 |

(Continued)

OTHER PUBLICATIONS

Wei Wang, Tao Xie, and Abhinav Sharma. 2016. SWANS: An interdisk wear-leveling strategy for RAID-0 structured SSD arrays. ACM Trans. Storage 12, 3, Article 10 (Apr. 2016), 21 pages. (Year: 2016).*

(Continued)

*Primary Examiner* — Ramon A. Mercado
(74) *Attorney, Agent, or Firm* — James Nock; Andrew D. Wright; Roberts, Calderon, Safran & Cole, P.C.

(57) ABSTRACT

A method for use in a dispersed storage network (DSN) includes receiving a data access request at a DSN memory that controls storage of encoded data slices in multiple storage units. The data access request is capable of being serviced using either of at least two different storage units. The DSN memory determines wear levels associated with the two different storage units, and selects one of them as a preferred storage unit based, at least in part, on the wear levels. The DSN memory fulfills the data access request using the preferred storage unit.

14 Claims, 7 Drawing Sheets

(56) References Cited

U.S. PATENT DOCUMENTS

2016/0062681 A1* 3/2016 Samuels ............... G06F 3/0619
                                                    711/103
2016/0179618 A1  6/2016 Resch et al.
2016/0274802 A1* 9/2016 Koo ..................... G06F 3/0659

OTHER PUBLICATIONS

Anonymous; Method and System for Classifying Memory Devices and Slices to Create Optimal Storage Decisions in Distributed Storage Network (DSN); Jan. 9, 2018; 3 pgs; IP.com No. IPCOM000252417D; IP.com.

Anonymously; Method and System for Securing a Distributed Storage Network Memory from Unauthorized Access from Users; Nov. 15, 2016; 2 pgs; IP.com No. IPCOM000248314D; ip.com.

Jiao, et al.; Multi-objective data placement for multi-cloud socially aware services; IEEE INFOCOM 2014—IEEE Conference on Computer Communications; 2014; pp. 28-36.

Jiao; L.; Online Social Network Data Placement over Clouds; Dissertation; 2014; 114 pgs.

Konwar, et al.; Storage-optimized data-atomic algorithms for handling erasures and errors in distributed storage systems; 2016 IEEE International Parallel and Distributed Processing Symposium (IPDPS); May 23-27, 2016; pp. 720-729.

* cited by examiner

OPTIMIZING DATA ACCESS IN A DSN MEMORY FOR WEAR LEVELING

BACKGROUND

Technical Field

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In some conventional storage systems, an attempt is made to minimize the time required for the storage system to respond to data access requests. This technique often involves sending data access requests to the fastest available storage devices, while leaving slightly slower storage devices rarely utilized. Unfortunately, this technique can result in premature failure of the more frequently accessed storage devices due to excessive wear.

SUMMARY

According to an embodiment of the present invention, a DSN memory, which controls storage of encoded data slices in multiple storage units, receives a data access request, e.g. a read or write request. The data access request is capable of being serviced using either of at least two different storage units. The DSN memory determines wear levels associated with the at least two different storage units, and selects either a first storage unit or a second storage unit as a preferred storage unit based, at least in part, on the wear levels. The DSN memory can then fulfill the data; access request using the preferred storage unit.

Various selection parameters for the preferred storage unit can include, selecting whichever of the first storage unit or the second storage unit has more available wear. The preferred storage unit can selected to equalize an available wear of the first storage unit with an available wear of the second storage unit, or to prevent an available wear of the first storage unit from being substantially equal to an available wear of the second storage unit. The preferred storage unit can also be selected based on a combination of the wear levels and a performance requirement associated with the data access request.

The DSN memory can obtain wear level information indicating how much data has been read from each of the at least two different storage units, and store that wear level information at the DSN memory, for example in a storage unit, or in a local memory not used for storing encoded data slices. Usage metadata can be obtained from the at least two different storage units, and used to determine available wear of the at least two different storage units.

Various embodiments can be implemented as a method, as a dispersed storage network (DSN) memory, or as a storage server.

DETAILED DESCRIPTION

Figure 1:
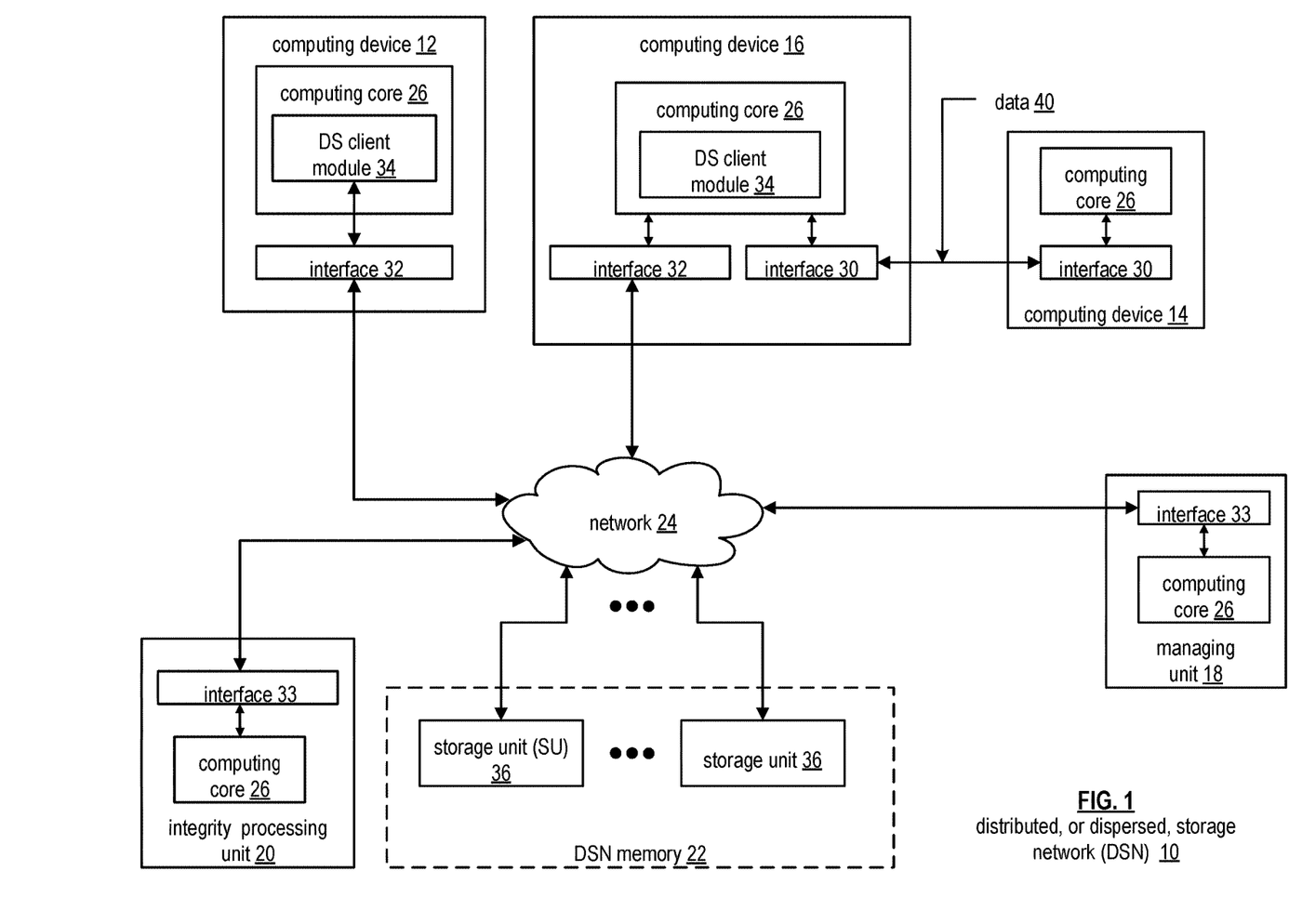
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
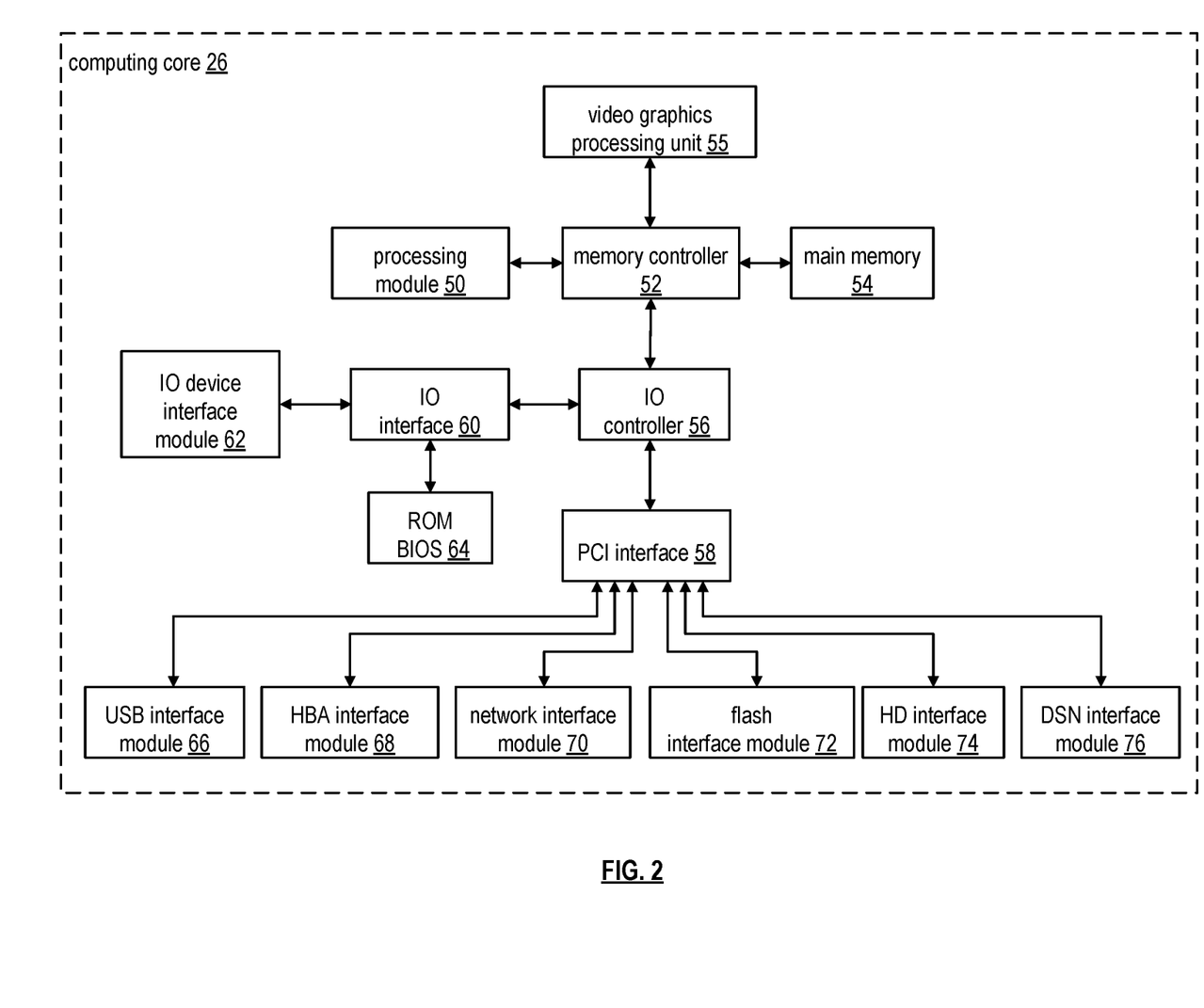
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
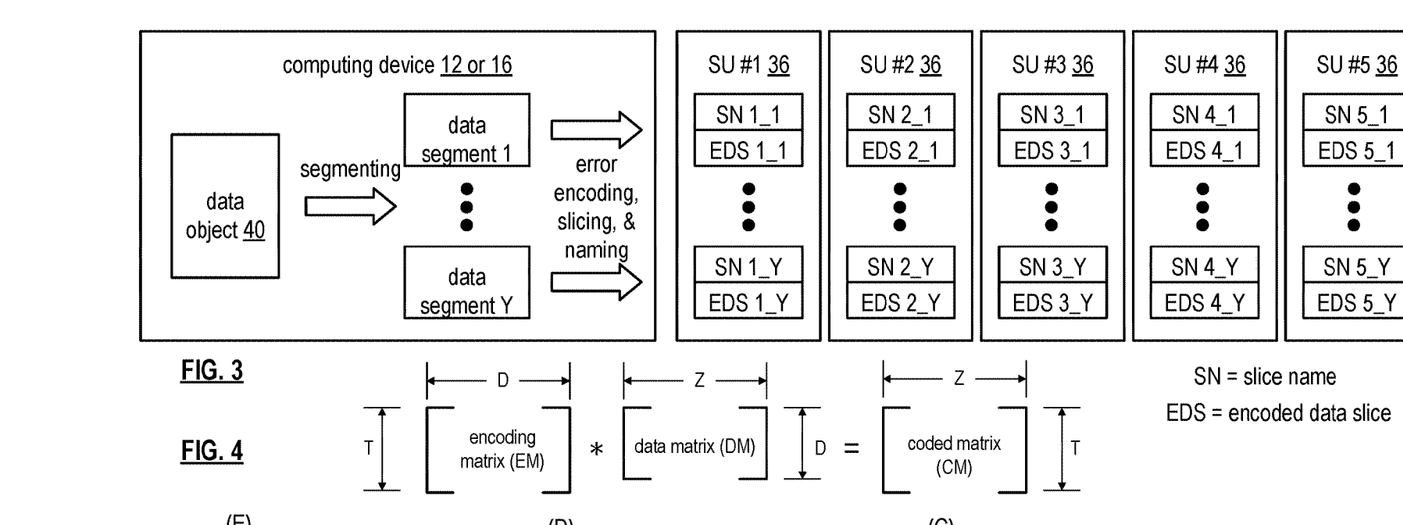
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
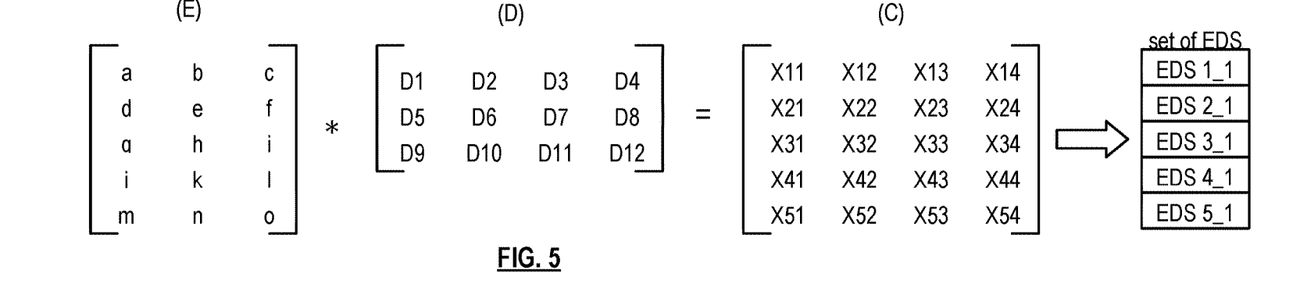
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
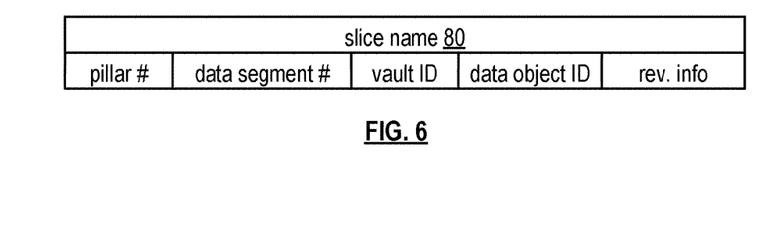
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
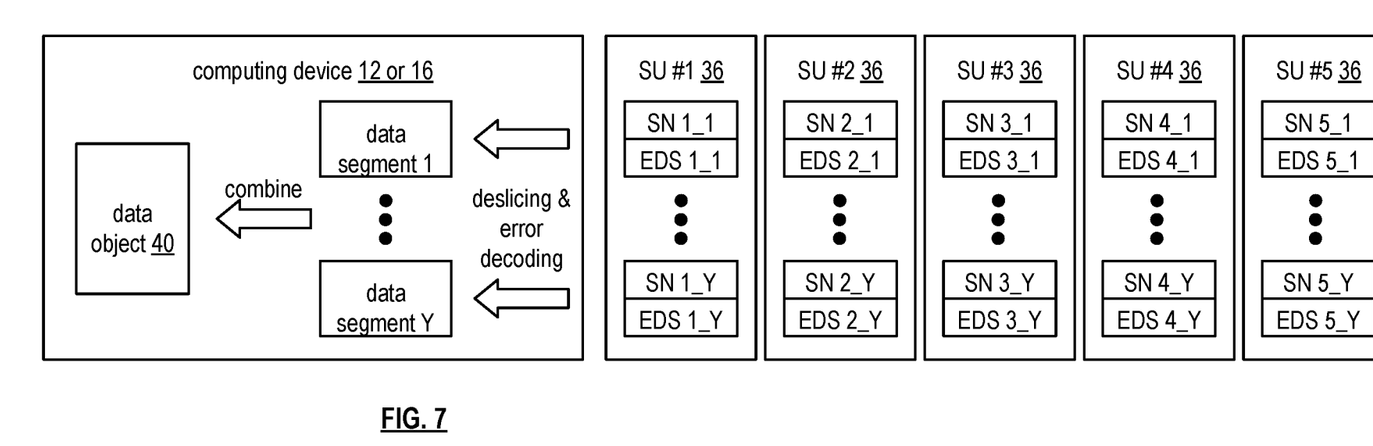
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
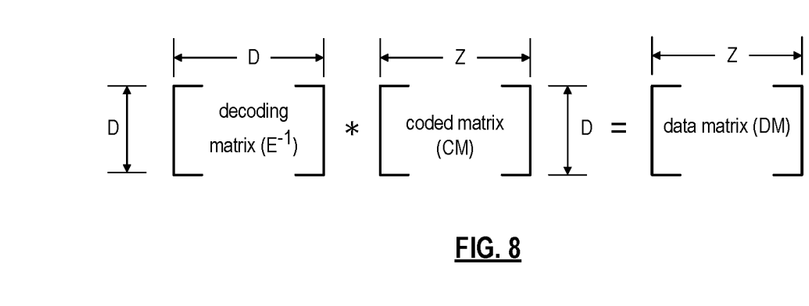
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

The systems and devices disclosed herein can be used to implement various techniques for optimizing data access for wear leveling. In general, a performance-optimized dispersed system that does not account for memory device wear tends to favor the fastest storage devices for data access requests, such as read requests, leaving slightly slower storage devices rarely utilized. Favoring the fastest storage devices, without accounting for wear caused by the access request, tends to wear out faster storage devices first. In cases where data requests are handled on a server-by-server basis, all storage devices associated with a faster servers can wear out more quickly than storage devices associated with slower servers. Even within a particular storage server, when faster memories are preferred by the server, the faster server memories can wear more quickly than slower memories. The term "storage device," as used herein, can include both storage servers, such as a DSN memory 22 of FIG. 1 which employ multiple memories or other storage units, such as storage units 36 of FIG. 1, and the storage units themselves.

In a specific example, Hard Disk Drives will wear proportionally with reads, and more frequently read Hard Disk Drives will fail earlier than others being read less. To avoid wearing out preferred drives, or drives on a preferred storage server, various embodiments disclosed herein implement a scheme to evenly read all storage devices and all hard drives. One way to accomplish this is to implement pure random, or pseudorandom, reads from storage devices. Another way is to store metadata on the memory of storage servers indicating how much data has been read from the memory devices used by the storage servers. This metadata can be used to determine and aggregate the overall wear on the storage server, or determine the wear of individual storage devices. Some models of memory devices have built-in usage metadata indicating how much data has been written and read, and this metric is used to determine wear amount.

The metadata, or other information indicating the wear amount, can be used to evenly distribute wear across storage devices, for example by sending data access requests to storage devices having more "available wear." Alternatively, data access requests can be routed to storage devices to purposefully over-wear certain memory devices, thereby providing a diverse wear level and preventing simultaneous failures of the same failure mechanism in a DSN. Another way to utilize the metadata is to test for age limits or usage limits, and notify system managers of wear-related risks. In various embodiments, a rebuilding process of a DSN uses wear-level metadata to decide which storage devices should have their data rebuilt, and to select a storage device to store rebuilt data. An implementation of the wear metadata, or other wear information, may allow a balanced approach between high performance and wear-leveling to provide a user-defined safety vs. performance level.

Various embodiments disclosed herein can be used not only in the context of distributed storage, but also to level wear on almost any system of components that is consumed by usage. As used herein, unless otherwise required by the context, leveling wear can include choosing to send data access requests to storage devices to equalize wear levels, to intentionally wear one storage device more than another storage device, or to otherwise manage the relative wear levels of storage devices.

The term "available wear" refers to an estimated amount of wear remaining. Consider, for example, two solid state drives, A and B, each having an estimated lifespan of 35,000 write cycles. If drive A has consumed 10,000 write cycles, while drive B has consumed only 5,000 write cycles, drive B can be said to have more available wear (30,000 cycles remaining) than drive A (only 25,000 cycles remaining). As another example, consider two new disk drives, C being rated for 300,000 load/unload cycles, and drive D being rated for 350,000 load/unload cycles. Drive D can be said to have more available wear. In some embodiments, a mean-time-between failure (MTBF) metric can be used as an indicator of wear, so that a drive E having an MTBF of 2 million hours and having been in operation for 50,000 hours can be said to have more available wear than a brand new drive having an MTBF of 1.5 million hours. In yet other embodiments, a number of read operations performed by two different drives can be used as an indication of available wear.

Figure 9:
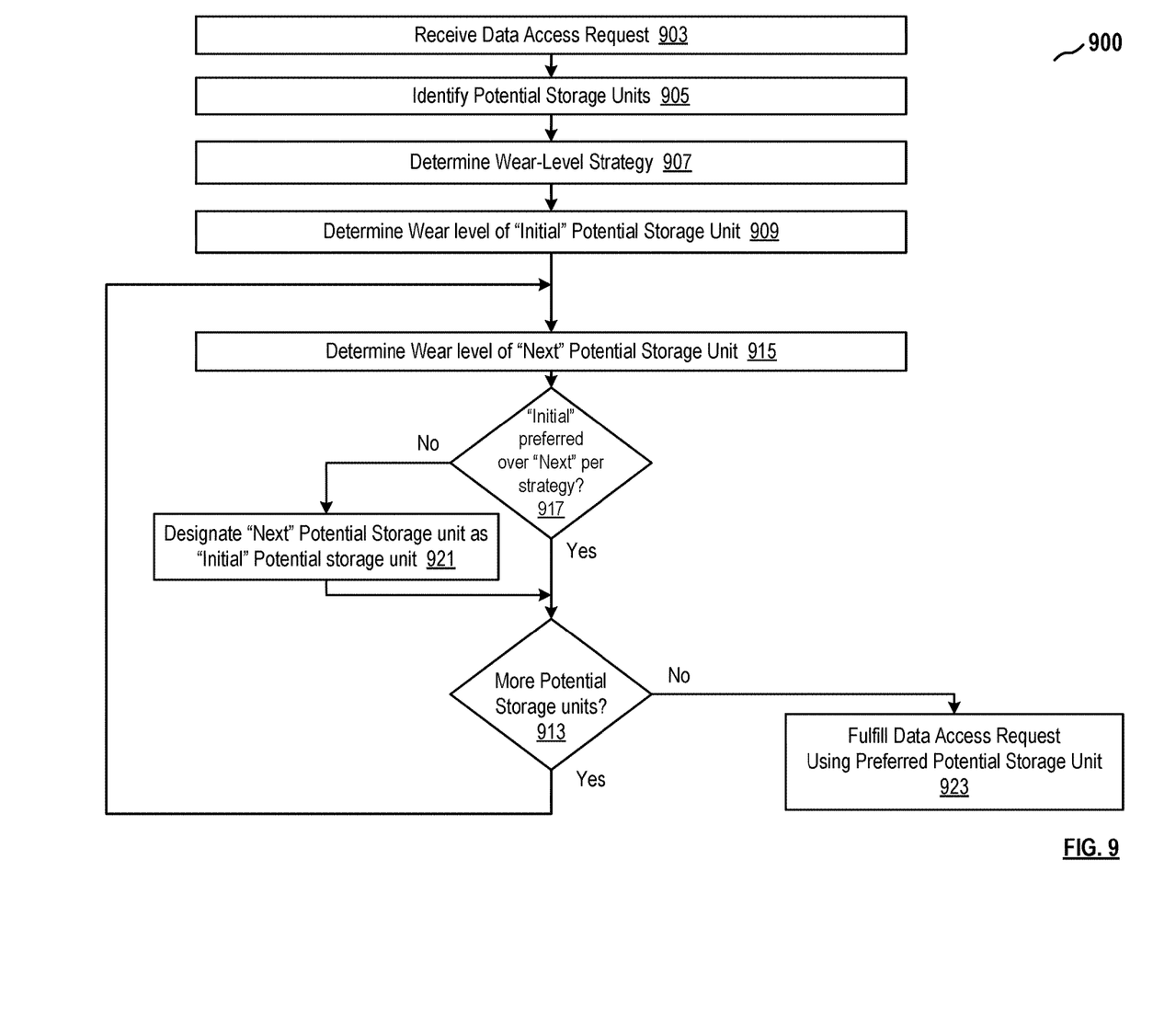
FIG. 9 is a flow diagram illustrating a method of optimizing data access in a DSN memory for wear leveling in accordance with various embodiments of the present invention.

Referring next to FIG. 9, a method 900, in which data access requests are sent to particular storage devices based, at least in part, on wear leveling considerations, is discussed according to various embodiments.

As illustrated by block 903, a data access request is received. The data access request can be a read request or a write request. In at least one embodiment, the data access request is generated by a requesting device, such as computing device 12 of FIG. 1, and received by a storage device, such as DSN memory 22 of FIG. 1. For example, where the access request is a read request, the read request can include information identifying a data object to be decoded from a read-threshold number of encoded data slices. Assume, for purposes of this example, that 6 encoded data slices are stored in various DSN memories and storage units that make up the DSN. Further assume that the read threshold is 3, so that the original data object can be recovered using any 3 of the 6 stored encoded data slices. Further assume, for purposes of this example, that the DSN memory receiving the data access request stores at least 2 of the encoded data slices in two different storage devices, so that the data access request is capable of being serviced using either of at least 2 storage units, such as storage units 36 shown in FIG. 1. Thus, the data access request can be fulfilled by the DSN memory transmitting either of the 2 encoded data slices to the requesting device. In this example, the requesting device can use either of the 2 encoded data slices, in conjunction with at least 2 other encoded data slices retrieved from other DSN memories, to rebuild the original data object.

As illustrated by block 905, the DSN memory determines storage units 36 (FIG. 1) that can be used to fulfill the data access request. These potential storage units include storage devices that can be used to fulfill the data access request. Continuing with the previous example, each storage device that current stores one or more of the encoded data slices can be designated as a potential storage unit. Thus, if 3 encoded data slices are required to reconstruct an original data object associated with a "read" data access request, and the DSN memory is currently storing 5 encoded data slices in each of 5 different storage units, each of those 5 storage units is a candidate, or potential storage unit. That is to say, the data access request can be serviced using one or more of the potential storage units.

As illustrated by block 907, the DSN memory selects a wear-level strategy. The wear level strategy selected can be request-specific, universally applicable to all data access requests, based on a default strategy with the possibility of override by command or request, based on a type of data access request (e.g. read or write); based on the identity of a requesting device; based on a current network performance level, based on information included in the data access request, based on a performance level of the DSN memory, or some combination thereof.

General wear level strategies include: selecting preferred storage units to achieve wear—diversity, which can help avoid failure of all storage devices having the same age at the same time; attempting to equally distribute wear across storage devices, and attempting to wear newer storage devices more quickly than older storage devices.

Specific wear level strategies include: selecting, as the preferred storage unit, whichever of the first storage unit or the second storage unit has more available wear; selecting the preferred storage unit to equalize an available wear of the first storage unit with an available wear of the second storage unit; selecting the preferred storage unit based on a combination of the wear levels and a performance requirement associated with the data access request; and selecting the preferred storage unit to prevent an available wear of the first storage unit from being substantially equal to an available wear of the second storage unit. Any of the general or specific wear level strategies can include allowances and adjustments for various performance factors. For example, a default wear level strategy can be temporarily suspended during periods of high usage, to prevent performance bottlenecks.

As illustrated by block 909, one of the potential storage units can be selected as an "initial" storage unit for purposes of comparison, and the wear level of that initial storage unit can be determined. In some embodiments, the fastest potential storage unit can be selected as the "initial" potential storage unit. Determination of the wear level of the initial storage unit can be based on metadata provided by a storage device, based on a running total of data access requests, e.g. read requests, serviced by the storage device or the like, based on a response to a query, based on a historical analysis of storage unit activity, or the like. In at least one embodiment, determination of a wear level includes determination of an amount of available wear remaining. In various embodiments, for example in cases where the storage device is a storage server, the storage server can store metadata indicating an aggregate number of data access requests fulfilled by the storage server and its memories.

Method 900 proceeds to block 915, where the wear level of the next potential storage unit is determined. In some embodiments, the same or different techniques for determining the wear level (or available wear) of the initial potential storage unit can be used for the next potential storage unit. Although not specifically illustrated, the wear-level of all potential storage units can be determined at block 909, at block 915, or at some other point. As illustrated by block 917, the wear level, and/or the available wear, of the initial potential storage unit is compared to the wear level, and/or the available wear, of the next potential storage unit to determine which of the two storage units being compared is "preferred."

This determination can be based on the wear-level strategy determined at block 907. Consider, for example, the case where the wear-level strategy specifies selecting preferred storage units to achieve wear diversity. If the initial potential storage unit has available wear that is less than the available wear of the next potential storage unit, the initial potential storage unit may be preferred over the next potential storage unit, because using the initial potential storage unit to service, or fulfill, the data access request would produce an even greater wear difference between the initial potential storage unit and the next potential storage unit. But if the wear-level strategy is to equalize available wear, the next potential storage unit would be preferred over the initial potential storage unit, because using the next potential storage unit to fulfill the data access request would result in less of a difference between the available wear of the initial potential storage unit and the next potential storage unit.

In some embodiments, selecting a preferred potential storage unit at block 917 can include making the selection based on a combination of the wear levels and one or more performance requirements, any or all of which can be associated with the data access request. For example, if the data access request specifies elevated-priority processing, and the difference between the available wear levels of the initial potential storage unit and the next potential storage unit is less than a threshold value, the access speed of the storage device can be taken into account to so that the faster storage device can be preferred, even if the other storage device would have been preferred if only the wear levels were considered. Different thresholds can be used for different wear level strategies, and in some instances thresholds need not be used, or can be used as a tie-breaker.

As illustrated by block 921, if the "next" potential storage unit is preferred over the "initial" potential storage unit, the "next" potential storage unit is re-designated as the "initial" potential storage unit, and a check is performed at block 913 to determine if there are any additional potential storage units to test. If the result of the determination at block 913 indicates that there are no more potential storage units to test, method 900 proceeds to block 923, where the data access request is fulfilled using the preferred storage unit. If the result of the determination at block 913 indicates that there are additional potential storage units to test, method 900 returns to block 915, where the wear level of the new "next" potential storage unit is determined.

If, however, the result of block 921 indicates that the "initial" potential storage unit is preferred over the "initial" potential storage unit, a check is performed at block 913 to determine if there are any additional potential storage units to test. If the result of the determination at block 913 indicates that there are no more potential storage units to test, method 900 proceeds to block 923, where the data access request is fulfilled using the preferred storage unit. If the result of the determination at block 913 indicates that there are additional potential storage units to test, method 900 returns to block 915, where the wear level of the new "next" potential storage unit is determined.

As described above, each of the potential storage units is tested against other potential storage units to determine the preferred storage unit that will be used to fulfill the data access request. In at least one embodiment, for example where multiple storage devices are used to obtain multiple encoded data slices, multiple "preferred" data storage units can be selected according to a similar process. For example, if DSN memory stores 4 encoded data slices in different storage devices, and fulfilling the data access request requires retrieving a read threshold number of encoded data slices, 3 potential memory stores out of 4 can be selected as "preferred" storage devices, leaving only a single memory store not preferred. In such a case, fulfilling the data access request can include reconstructing the original data object from the read threshold number of encoded data slices, and transmitting the original data object to the requesting device using, for example, a public key encryption technique.

Figure 10:
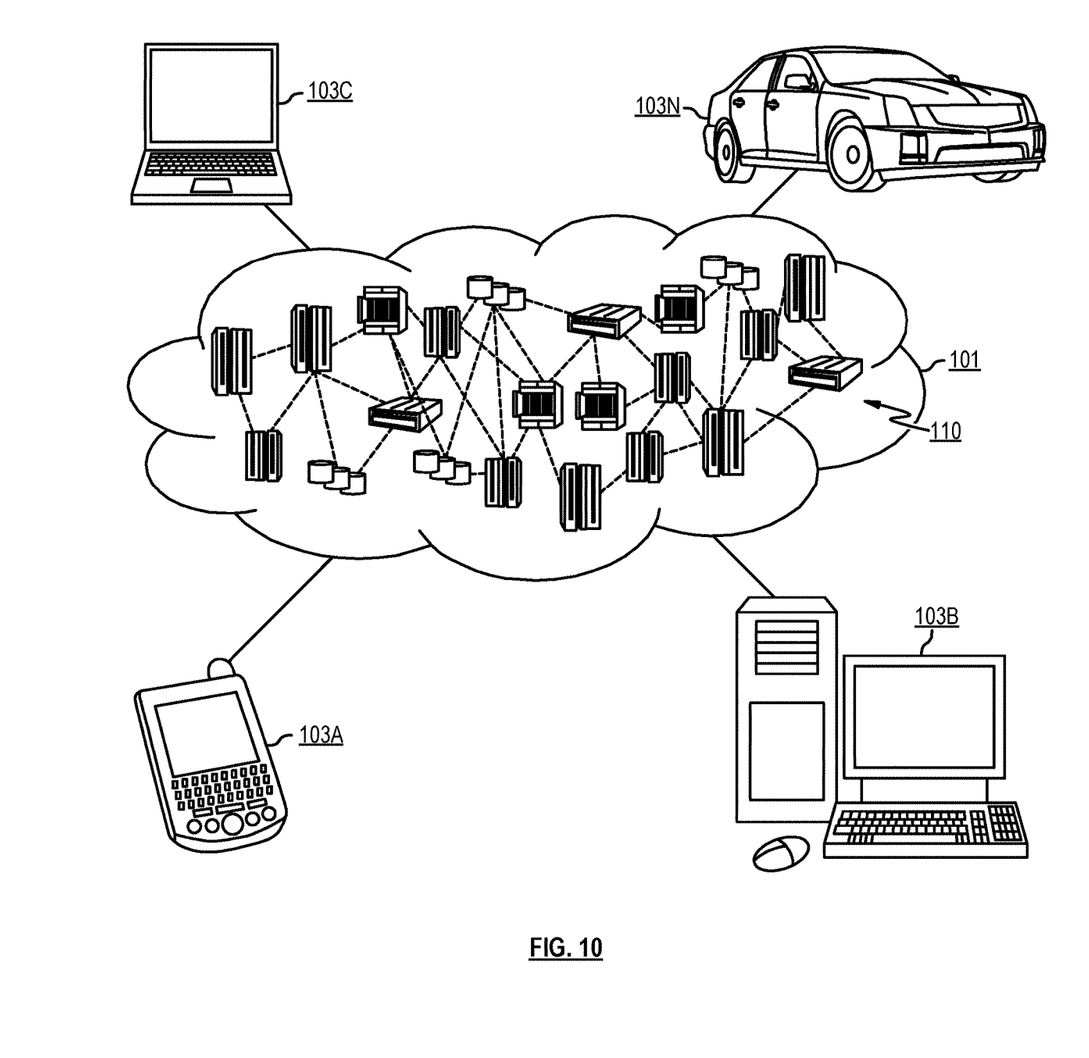
FIG. 10 depicts a cloud computing environment according to various embodiments of the present invention.

FIG. 10 depicts a cloud computing environment according to various embodiments of the present invention. FIG. 10 presents an illustrative cloud computing environment 101. As shown, cloud computing environment 101 includes one or more cloud computing nodes 110 with which local computing devices used by cloud consumers, such as, for example, personal digital assistant (PDA) or cellular telephone 103A, desktop computer 103B, laptop computer 103C, and/or automobile computer system 103N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 101 to offer infrastructure, platforms and/or software as services for which a cloud consumer does not need to maintain resources on a local computing device. It is understood that the types of computing devices 103A-N shown in FIG. 10 are intended to be illustrative only and that computing nodes 110 and cloud computing environment 101 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
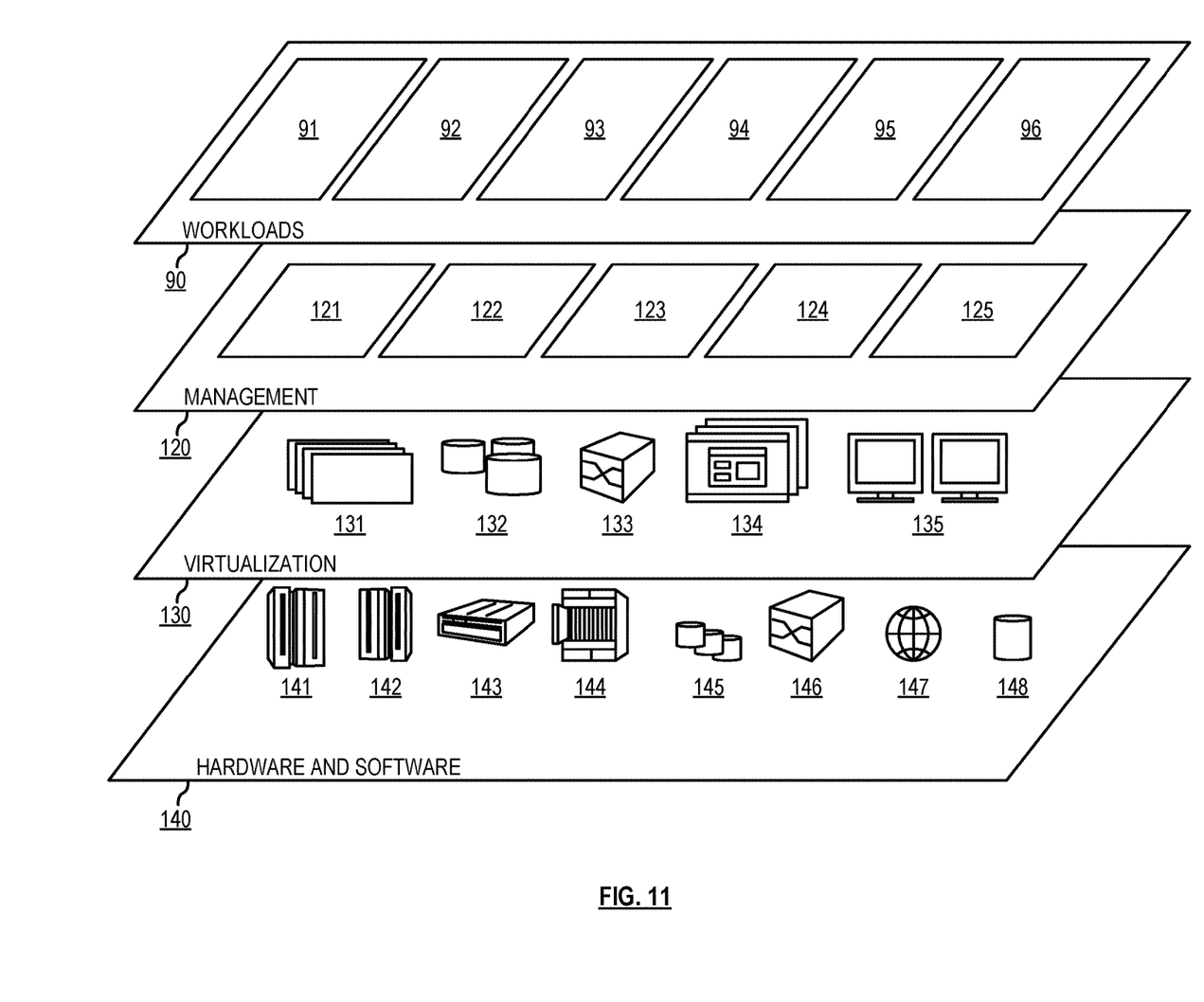
FIG. 11 depicts abstraction model layers according to various embodiments of the present invention.

FIG. 11 depicts abstraction model layers according to various embodiments of the present invention. Referring now to FIG. 11, a set of functional abstraction layers provided by cloud computing environment 101 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 140 includes hardware and software components. Examples of hardware components include: mainframes 141; RISC (Reduced Instruction Set Computer) architecture based servers 142; servers 143; blade servers 144; storage devices 145; and networks and networking components 146. In some embodiments, software components include network application server software 147 and database software 148. In some embodiments, one or more hardware components can be implemented by utilizing the computing core 26 of FIG. 2.

Virtualization layer 130 provides an abstraction layer from which the following examples of virtual entities may be provided: virtual servers 131; virtual storage 132; virtual networks 133, including virtual private networks; virtual applications and operating systems 134; and virtual clients 135.

In one example, management layer 120 may provide the functions described below. Resource provisioning 121 provides dynamic procurement of computing resources and other resources that are utilized to perform tasks within the cloud computing environment. Metering and Pricing 122 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 123 provides access to the cloud computing environment for consumers and system administrators. Service level management 124 provides cloud computing resource allocation and management such that required service levels are met. Service Level Agreement (SLA) planning and fulfillment 125 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing data access of storage devices to account for wear leveling 96.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use in a dispersed storage network (DSN), the method comprising:
receiving, at a DSN memory controlling storage of encoded data slices in a plurality of storage units, a data read request capable of being serviced using either of a first storage unit storing a first encoded data slice and a second storage unit storing a second encoded data slice;
determining, by the DSN memory, wear levels associated with each of the first storage unit and the second storage unit;
selecting either the first storage unit or the second storage unit as a preferred storage unit based, at least in part, on the wear levels;
selecting the preferred storage unit to prevent an available wear of the first storage unit from being substantially equal to an available wear of the second storage unit; and
fulfilling the data read request using the preferred storage unit.

2. The method of claim 1, further comprising:
selecting, as the preferred storage unit, whichever of the first storage unit or the second storage unit has more available wear.

3. The method of claim 1, further comprising:
selecting the preferred storage unit based on a combination of the wear levels and a performance requirement associated with the data read request.

4. The method of claim 1, further comprising:
obtaining, at the DSN memory, wear level information indicating how much data has been read from each of the first storage unit and the second storage unit; and
storing the wear level information at the DSN memory.

5. The method of claim 1, further comprising:
obtaining usage metadata from the first storage unit and the second storage unit; and
using the usage metadata to determine the available wear of the first storage unit and the available wear of the second storage unit.

6. The method of claim 1, wherein the selecting either the first storage unit or the second storage unit as the preferred storage unit is further based on an identity of a requesting device and information in the data access request.

7. A dispersed storage network (DSN) memory comprising:
a processor and associated memory;
a plurality of storage units coupled to the processor and associated memory, the plurality of storage units configured to store encoded data slices used to reconstruct an original piece of data;
the processor and associated memory configured to:
receive a data read request capable of being serviced using either of a first storage unit storing a first encoded data slice and a second storage unit storing a second encoded data slice;
determine wear levels associated with each of the first storage unit and the second storage unit;
select either the first storage unit or the second storage unit as a preferred storage unit based, at least in part, on the wear levels;
select the preferred storage unit to prevent an available wear of the first storage unit from being substantially equal to an available wear of the second storage unit; and
fulfill the data read request using the preferred storage unit.

8. The dispersed storage network (DSN) memory of claim 7, wherein the processor and associated memory are further configured to:
select, as the preferred storage unit, whichever of the first storage unit or the second storage unit has more available wear.

9. The dispersed storage network (DSN) memory of claim 7, wherein the processor and associated memory are further configured to:
select the preferred storage unit based on a combination of the wear levels and a performance requirement associated with the data read request.

10. The dispersed storage network (DSN) memory of claim 7, wherein the processor and associated memory are further configured to:
obtain wear level information indicating how much data has been read from each of the first storage unit and the second storage unit; and
store the wear level information in the associated memory.

11. The dispersed storage network (DSN) memory of claim 7, wherein the processor and associated memory are further configured to:
obtain usage metadata from the first storage unit and the second storage unit; and
utilize the usage metadata to determine the available wear of the first storage unit and the available wear of the second storage unit.

12. A storage server comprising:
a processor and associated memory;
a plurality of storage units coupled to the processor and associated memory, the plurality of storage units configured to store encoded data slices used to reconstruct a data object;
the processor and associated memory configured to:
receive a read request capable of being serviced using either of a first storage unit storing a first encoded data slice and a second storage unit storing a second encoded data slice;
determine wear levels associated with each of the first storage unit and the second storage unit;
select either the first storage unit or the second storage unit as a preferred storage unit based, at least in part, on the wear levels; and
fulfill the read request using the preferred storage unit,
wherein the processor and associated memory are further configured to select the preferred storage unit to prevent an available wear of the first storage unit from being substantially equal to an available wear of the second storage unit.

13. The storage server of claim 12, wherein the processor and associated memory are further configured to:
select, as the preferred storage unit, whichever of the first storage unit or the second storage unit has more available wear.

14. The storage server of claim 12, wherein the processor and associated memory are further configured to:
select the preferred storage unit based on a combination of the wear levels and a performance requirement associated with the read request.

* * * * *